United States Patent [19]

Ahrens

[11] 4,393,812

[45] Jul. 19, 1983

[54] SWINE FARROWING HUT AND METHOD OF FARROWING PIGS AND MAINTAINING A DISEASE - FREE FARROWING HUT

[75] Inventor: Claude W. Ahrens, Grinnell, Iowa

[73] Assignee: Miracle Recreation Equipment Company, Grinnell, Iowa

[21] Appl. No.: 267,089

[22] Filed: May 26, 1981

Related U.S. Application Data

[63] Continuation of Ser. No. 945,084, Sep. 25, 1978, Pat. No. 4,269,144.

[51] Int. Cl.³ .............................................. A01K 1/02
[52] U.S. Cl. .................................................... 119/16
[58] Field of Search ........................ 119/15, 16, 19, 20

[56] References Cited

U.S. PATENT DOCUMENTS

| | | | |
|---|---|---|---|
| 920,975 | 5/1909 | Minion | 119/19 |
| 1,230,237 | 6/1917 | Sturm | 119/16 |
| 1,439,157 | 12/1922 | Ford | 119/16 |
| 1,875,433 | 9/1932 | Fitzpatrick | 119/16 |
| 3,181,503 | 5/1965 | Tripp | 119/52 R X |
| 3,601,096 | 8/1971 | Rutherford | 119/16 X |
| 3,995,592 | 12/1976 | Goldstaub et al. | 119/16 |

FOREIGN PATENT DOCUMENTS 114108  3/1918 United Kingdom .................. 119/19
377893  8/1932 United Kingdom .................. 119/19

Primary Examiner—Robert P. Swiatek
Attorney, Agent, or Firm—Zarley, McKee, Thomte, Voorhees & Sease

[57] ABSTRACT

A farrowing hut structure of non-porous fiberglass material is pivotally connected at one of its ends to one end of a fiberglass floor for being pivoted between lowered and raised positions with the floor and interior of the hut structure being fully exposed to the sun and atmosphere when the hut is in its raised upended position. The hut is divided into a center sow section with pig sections on opposite sides and the floor includes heating elements embedded therein for heating the pig sections. An open top pen enclosure is connected to the hut enclosure at the end opposite the end pivotally connected to the floor. The pen floor and the hut structure in one embodiment is formed from fiber glass while in a second embodiment, the pen floor is concrete and is connected to a waste gutter which receives waste products from the hut structure and pen enclosure due to the hut structure and pen enclosure being placed on an incline sloping toward the waste gutter. A pig feeder may be placed on either end door in the center sow section or in the pig sections on an exterior wall in the proximity of a feed and pig access door for filling the feeder and removing pigs.

1 Claim, 9 Drawing Figures

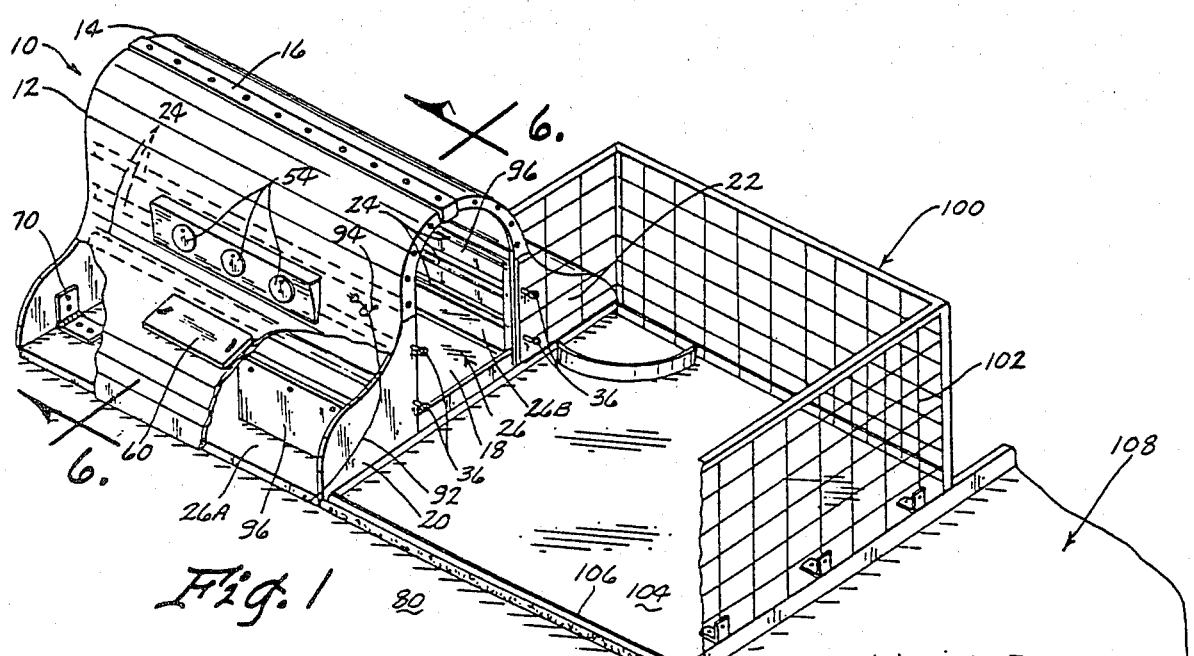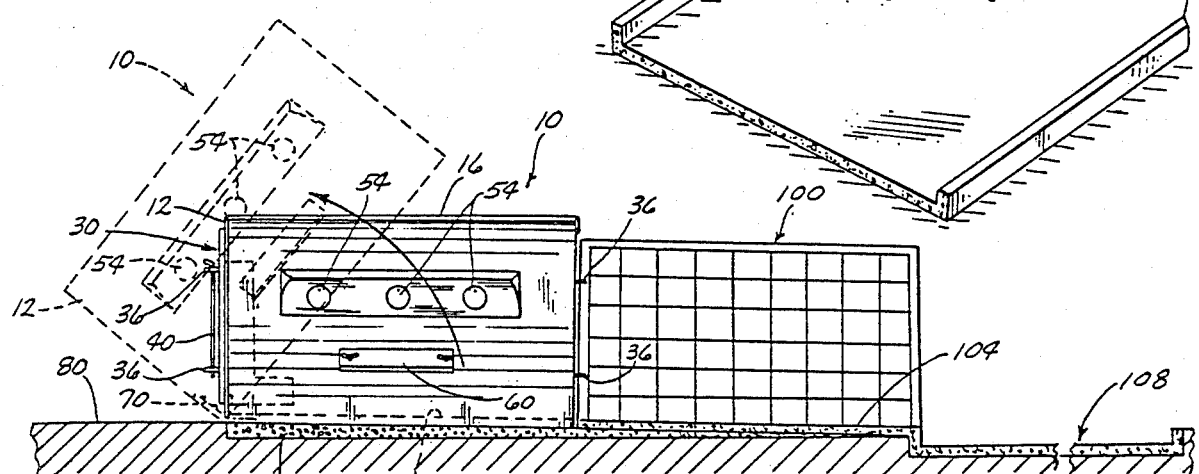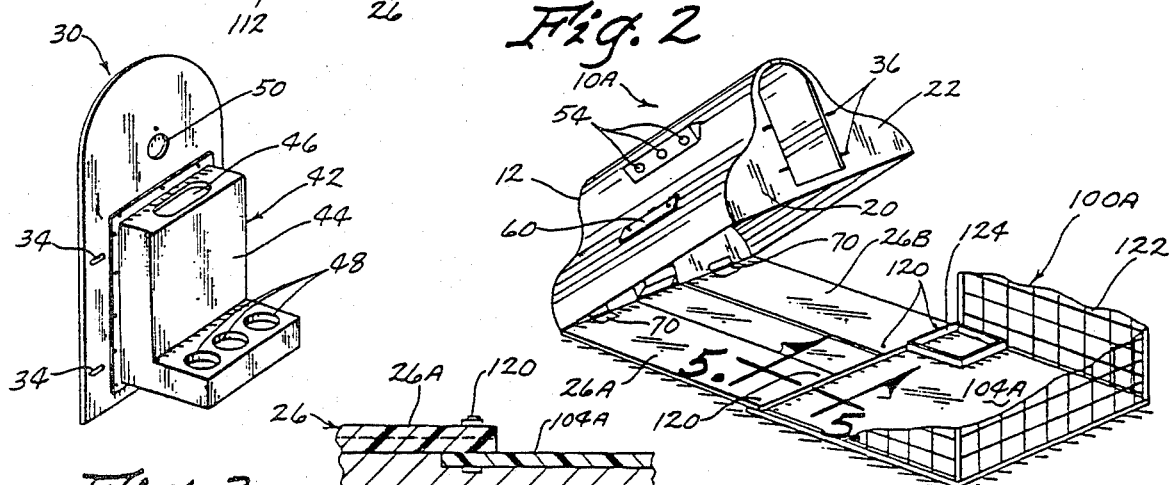

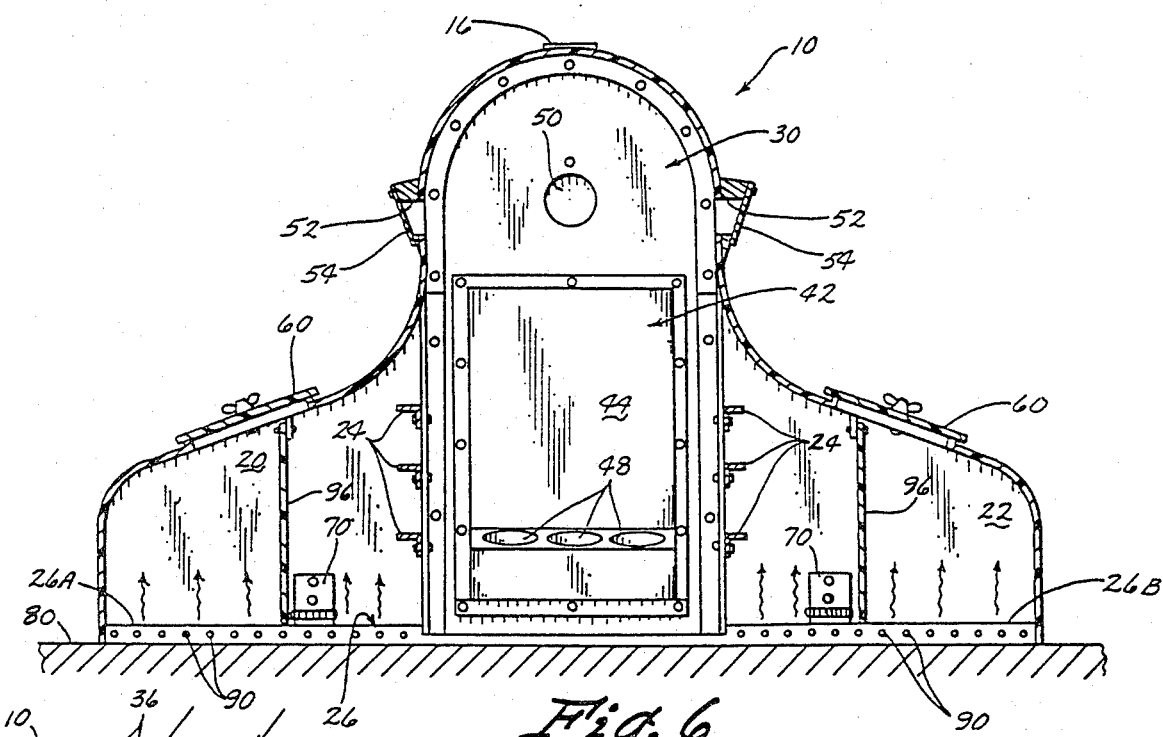
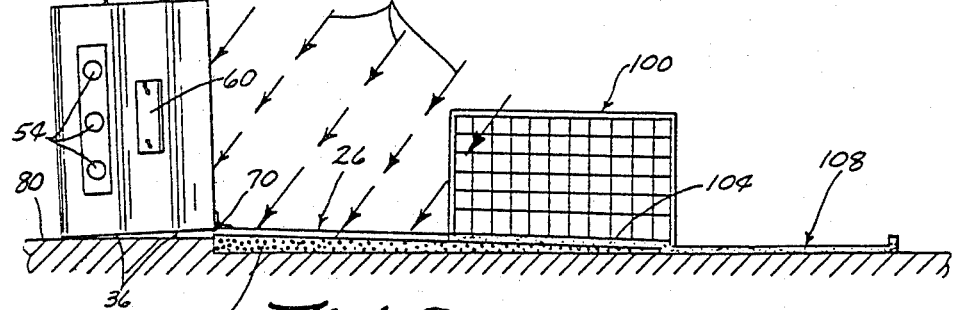
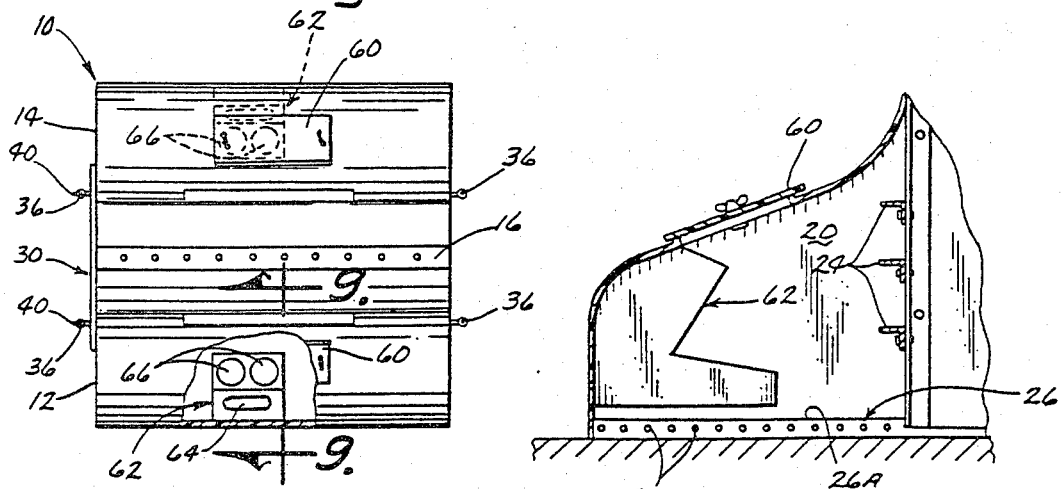

SWINE FARROWING HUT AND METHOD OF FARROWING PIGS AND MAINTAINING A DISEASE - FREE FARROWING HUT

This is a continuation of application Ser. No. 945,084, filed Sept. 25, 1978, and now U.S. Pat. No. 4,269,144.

BACKGROUND OF THE INVENTION

Multifarrowing unit structures suffer from disease problems since cleaning is difficult and the killing of all bacteria uncertain due to the interior of the structure being shielded from the sun's direct ultraviolet rays which would kill all bacteria.

Disease is spread by the bateria penetrating the wood or concrete material of the floors and being retained there indefinitely thereby exposing each litter that uses the same area. There is no effective way to remove all of the bacteria since it usually penetrates too deeply into the concrete or wood material. Also, animals housed in a common building necessarily breath the same air and if disease is present in the building it will be spread to all animals breathing the common air.

The large farrowing structures also lack the ability to be moved about which is necessary for maintaining farrowing structures on fresh ground at all times.

A probelm with outdoor farrowing units has also been the difficulty of cleaning these units and keeping them free of disease-spreading bacteria. Furthermore, these outdoor units are unusable in cold weather since small pigs cannot endure the colder weather.

Accordingly, a farrowing enclosure is needed that is simple in construction, easy to clean and be moved about thereby assuring the sow and pigs that they will have a clean disease-free fresh air environment.

SUMMARY OF THE INVENTION

The farrowing hut of this invention meets all objectives by being easily cleaned by tilting the hut structure to an upended position on the ground off the floor to which the structure is pivotally connected. The sun through its ultraviolet rays kills all bacteria inside the fully exposed interior of the hut structure and the floor.

Substantially the entire structure including the floor is made from a non-porous fiberglass material which bacteria cannot penetrate as is the case with wood or concrete. Accordingly, then the floor and the interior are washed out with water and then exposed to the rays of the sun the bacteria will all be killed. Any disease one litter may have will be eradicated at this time and will not be passed on to the next sow and her litter. Since the litters are outside and separated they will not be breathing the same air thereby eliminating any possibility of disease being spread should any single litter be infected.

The hut structure can be used year around even through the coldest winters by using the heating elements in the pig sections wherein the heating elements are embedded in the fiber glass floor thereby keeping the pig sections as warm as desired for a minimum of cost.

The hut enclosure is connected to a pen enclosure and an end floor may be provided at either end of the hut structure and may include on the inside face a pig feeder or the pig feeder may be placed in the pig sections on the exterior wall where feed will only be accessible to the pigs and not the sow. An access opening in the exterior wall allows feed to be placed in the feeder from the outside.

A waste gutter may be provided on the opposite end of the pen enclosure from the hut structure with the hut structure and pen having floors which slope toward the waste gutter thereby allowing waste materials to be moved by gravitational forces to the waste gutter. The floor of the pen enclosure and the waste gutter may be of concrete or fiber glass material just as the hut structure is constructed.

Wind is kept from the pigs in the pig sections of the hut structure by vertically disposed wind guards running a portion of the length adjacent the open end wall passageways. The sow and the pigs in the oppositely disposed pig sections are maintained apart by longitudinally extending retaining bars which allow the pigs to move about thereunder but restrain the sow from entering the pig sections.

BRIEF DESCRIPTION OF THE DRAWINGS

FIG. 1 is a fragmentary perspective view of the farrowing hut, pen enclosure, and waste gutter.

FIG. 2 is a reduced in scale side elevational view showing the hut structure being pivoted in a dashline position.

FIG. 3 is a perspective view of an end door including a pig feeder unit attached thereto.

FIG. 4 is a reduced in scale perspective view of an alternate embodiment wherein the pen floor is fabricated from fiber glass and is bolted to and under the hut floor.

FIG. 5 is a cross-sectional view taken along line 5—5 in FIG. 4.

FIG. 6 is a cross-sectional view taken along line 6—6 in FIG. 1.

FIG. 7 is a reduced in scale side elevational view showing the hut structure in its fully open position with the hut being upended on the ground adjacent the hut floor.

FIG. 8 is a fragmentary reduced in scale top plan view of the hut only.

FIG. 9 is a cross-sectional view taken along line 9—9 in FIG. 8, and showing the pig feeder units mounted on the exterior wall in the pig sections.

DESCRIPTION OF THE PREFERRED EMBODIMENT

The hut structure of this invention is referred to generally in FIG. 1 by the reference numeral 10 and includes two half sections 12 and 14 molded of fiber glass material and interconnected along the top by connecting straps 16. The hut structure provides a sow section 18 flanked by oppositely disposed pig sections 20 and 22.

The center sow section 18 extends laterally to the vertically disposed wall of angle iron retaining bars 24 with the bottom retaining bar being spaced high enough above the floor 26 to allow a pig to move thereunder so that it may travel freely from the pig sections 20 and 22 into the sow section 18.

The ends of the hut 10 are open but may be closed by end doors 30 such as seen in FIG. 3, and in FIG. 8. The end door 30 is secured in place by eyebolts 36 extending through aligned openings 34 on the end door 30 followed by locking rods 40 extending through the eyebolts 36.

A pig feeder unit 42 may be secured to the inside face of the indoor 30, as seen in FIG. 3 and includes a feed storage compartment 44 having a fill hole 46 at the top with feeder holes 48 at the bottom. The feed unit may be filled by removal of the end door or through an air circulation opening 50 directly above the filler hole 46.

Additional air circulation holes 52 are provided on opposite sides of the hut structure and are closable by covers 54.

An excess cover 60 is provided on each side directly over the pig compartments 20 and 22 centrally thereof whereby pigs may be placed in the pig compartments or removed therefrom or feed may be placed in an exterior wall mounted pig feeder 62 (FIG. 9) having a fill opening 64 directly below the cover 60. Feed holes 66 (FIG. 8) are accessible only from within the pig compartments or sections.

The cleaning of the hut structure is easily accomplished by virtue of the fact that the hut structure 10 is pivotally connected by hinges 70 to the floor 26 such that, as seen in FIG. 2, the hut 10 may be pivoted towards an upended position of the floor 26 where, as seen in FIG. 7, an end wall is resting on the ground 80 fully exposing the interior of the hut structure and the floor 26 to the rays 82 of the sun and additionally allowing air circulation throughout. The hut structure being fabricated from lightweight fiber glass is easily tipped up to the cleaning position of FIG. 7.

The hut structure is an all-year-round farrowing unit due to the inclusion of heating elements 90 in the floor portions 26A and 26B in the pig sections 20 and 22. An electrical cord 92 may be conveniently connected to an exterior electrical power source and when not in use may be held on the exterior of the structure by a hook 94.

The pigs in the pig compartments 20 and 22 are protected from wind entering the sow center section 18 by wind guards 96 hanging from the top wall over the pig sections. The guards 96 are flexible and made of rubber material and extend approximately a quarter of the length of the hut structure in the area of the open ends which will allow air to enter. The pigs may move under the wind guards or around the end.

As seen in FIGS. 1 and 2, a pen enclosure 100 is provided at the end of the hut structure 10 opposite the pivotal connection between the hut structure and the floor 26. The enclosure 100 includes a wire fence 102 connected to a concrete floor 104 having upstanding side curbs 106. A waste gutter may also be provided at the end of the pen 100 opposite the hut structure 10 and may be in communication with a series of farrowing huts positioned in side-by-side relation such that waste materials from each of the farrowing huts will be fed into a common waste qutter 108. The farrowing hut and the pen 100 are sloped toward the waste gutter 108 by being placed on gravel which diminishes in thickness towards the waste gutter 108.

An alternate embodiment is illustrated in FIGS. 4 and 5 and is better suited for being moved about from one area to another since the pen enclosure 100A includes a floor 104A of fiber glass material fastened to the fiber glass floor 26A of the hut structure 10A by bolts 120. A wire fence 122 extends around the floor 104A and provides a feeding and exercise area for the sow and pigs. A watering trough 124 is provided in the pen enclosure 100A. The hut floor portions 26A and 26B in the pig sections also include heating elements as illustrated in FIG. 6 for heating the pig sections.

1. Method of farrowing pigs and providing and maintaining a disease free single litter farrowing hut wherein the hut includes a floor and an enclosure with the enclosure being pivotable from a position over the floor to an open raised position whereby the floor and the entire interior of the enclosure may be exposed to the sun, including the steps of, providing a substantially nonporous hut, which bacteria cannot penetrate, locating the farrowing hut outside in the open in substantial spaced relation to other farrowing huts so that each litter has fresh air and is not breathing the air from another adjacent litter and in a position relative to the sun that sun rays will reach the substantial area of the floor and interior of the enclosure when in the raised open position, following the removal of one sow and litter and before the admission of the next sow pivoting the enclosure to the raised open position and washing the floor and the interior of the enclosure thoroughly, maintaining the enclosure in the open position such that the floor and enclosure interior are exposed to the sun's rays long enough to kill all bacteria in the hut, and lowering the enclosure to the closed position and moving another sow into the hut for farrowing.

* * * * *